United States Patent
Miani et al.

(10) Patent No.: US 12,123,792 B2
(45) Date of Patent: Oct. 22, 2024

(54) HIGHLY SENSITIVE RESONANT FORCE SENSOR WITH A TEST BODY AND AT LEAST ONE RESONANT ELEMENT DECOUPLED AND EACH DISPOSED IN A SUITABLE ENVIRONMENT

(71) Applicant: COMMISSARIAT A L'ENERGIE ATOMIQUE ET AUX ENERGIES ALTERNATIVES, Paris (FR)

(72) Inventors: Théo Miani, Grenoble (FR); Marc Sansa Perna, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 29 days.

(21) Appl. No.: 17/934,214

(22) Filed: Sep. 22, 2022

(65) Prior Publication Data
US 2023/0096612 A1   Mar. 30, 2023

(30) Foreign Application Priority Data
Sep. 24, 2021   (FR) ...................................... 21 10059

(51) Int. Cl.
*G01L 1/18*   (2006.01)
*G01F 1/28*   (2006.01)
(Continued)

(52) U.S. Cl.
CPC ............... *G01L 1/183* (2013.01); *G01F 1/28* (2013.01); *G01P 15/097* (2013.01); *G01P 2015/0817* (2013.01); *G01P 2015/0831* (2013.01)

(58) Field of Classification Search
CPC .......... G01L 1/183; G01F 1/28; G01P 15/097; G01P 2015/0817; G01P 2015/0831; G01P 2015/082
See application file for complete search history.

(56) References Cited

U.S. PATENT DOCUMENTS

2007/0022814 A1* 2/2007 Seto ........................ G01P 1/023
                                                                73/514.34
2011/0234206 A1* 9/2011 Kawakubo .............. G01P 15/18
                                                                324/162
(Continued)

FOREIGN PATENT DOCUMENTS

EP          3 766 830 A1    1/2021

OTHER PUBLICATIONS

French Preliminary Search Report issued Jul. 27, 2022 in French Application 21 10059 filed on Sep. 24, 2021, 2 pages (with English Translation of Categories of Cited Documents).
(Continued)

*Primary Examiner* — Xin Y Zhong
(74) *Attorney, Agent, or Firm* — Oblon, McClelland, Maier & Neustadt, L.L.P.

(57) ABSTRACT

A force sensor including a support, a test body, two strain gauges, mechanical transmission means between the test body and the strain gauges so that a movement of the test body applies a strain onto the strain gauges in a first direction of the plane of the sensor, the transmission means being hinged relative to the support about a second direction in the plane of the sensor, the test body being accommodated within a first volume, the strain gauges being accommodated within a second volume, insulated by sealed insulation means. The sensor includes a sacrificial layer, a nanometric layer, a protective layer and a micrometric layer. The test body and at least one portion of the support are formed in the substrate, the sealed insulation means are partially formed by the nanometric layer and by the sacrificial layer, and the strain gauges are formed in the nanometric layer.

18 Claims, 7 Drawing Sheets

(51) Int. Cl.
  *G01P 15/097*    (2006.01)
  *G01P 15/08*    (2006.01)

(56) References Cited

U.S. PATENT DOCUMENTS

| | | |
|---|---|---|
| 2015/0355221 A1 | 12/2015 | Robert et al. |
| 2020/0041538 A1 | 2/2020 | Hocking |
| 2021/0018378 A1 | 1/2021 | Joet et al. |

OTHER PUBLICATIONS

Martin et al., "Strain Gauge Pressure and Volume-Flow Transducers Made by Thermoplastic Molding and Membrane Transfer", IEEE, 1998, 6 pages.

Yucetas et al., "A High-Resolution Accelerometer With Electrostatic Damping and Improved Supply Sensitivity", IEEE Journal of Solid-State Circuits, vol. 47, No. 7, Jul. 2012, 10 pages.

Ding et al., "A high-sensitivity biaxial resonant accelerometer with two-stage microleverage mechanisms", Journal of Micromechanics and Microengineering, 2016, 12 pages.

Mustafazade et al., "A vibrating beam MEMS accelerometer for gravity and seismic measurements", Scientific Reports, 2020, 8 pages.

\* cited by examiner

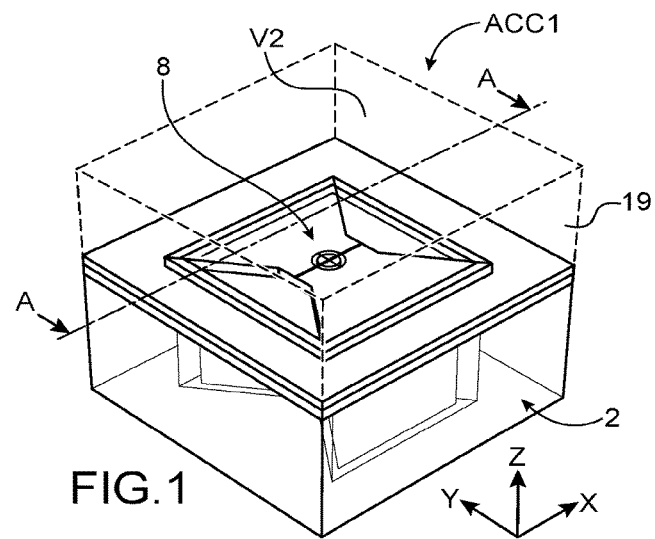
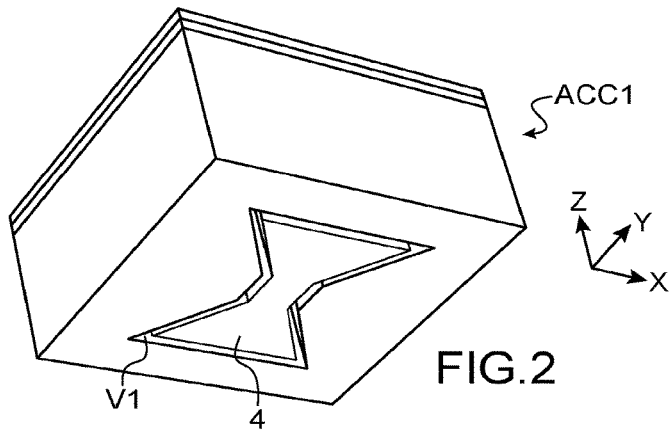
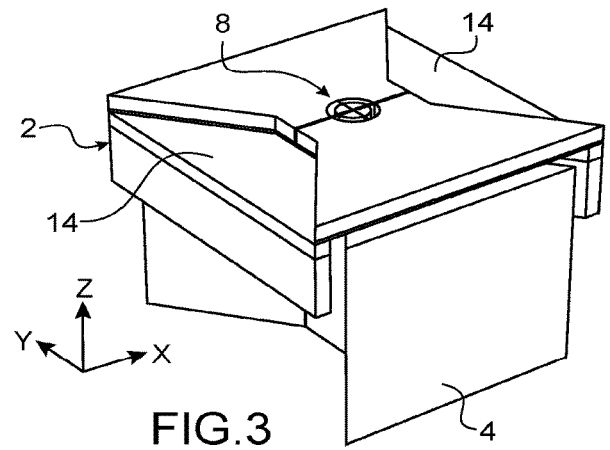

HIGHLY SENSITIVE RESONANT FORCE SENSOR WITH A TEST BODY AND AT LEAST ONE RESONANT ELEMENT DECOUPLED AND EACH DISPOSED IN A SUITABLE ENVIRONMENT

TECHNICAL FIELD AND PRIOR ART

The present invention relates to a highly sensitive sensor with a test body and at least one resonant element decoupled and each disposed in a suitable environment.

A resonant accelerometer is an example of a resonant sensor including a mass hanging to a support and movable in the plane or in an out-of-plane direction by the effect of an acceleration and at least one resonator hanging between the support and the mass. For example, the resonator is formed by a vibrating beam, i.e. a beam set to vibrate at its resonance frequency by electrodes. When the mass moves by the effect of an acceleration, the beam which is mechanically secured to the mass is compressed or stretched, which modifies its resonance frequency. The variation of its resonance frequency is detected, which allows deducing the value of the acceleration. The resonant beam is used as a force sensor.

The accelerometers manufactured according to the MEMS&NEMS (Microelectromechanical systems & Nanoelectromechanical systems) technology include a mass with micrometric dimensions, i.e. having a footprint of a few 100 μm by side to a few mm by side, for example formed by a square of 1,000 μm. For example, the thickness of the mass can reach up to 700 μm due to the thickness of the substrate, and one or more resonant beam(s) or resonator(s) with nanometric dimensions, referred to as nanoresonators. The nanoresonators are beams whose dimensions can be as follows: a length of a few μm to a few tens of μm and a nanometric section of a few tens of nm to 1 μm by side.

By miniaturising the beams relative to the mass, it is possible to reach a much more significant sensitiveness to acceleration than that reached by accelerometers including a seismic mass and micrometric-sized beams.

A resonator with nanometric dimensions or nanoresonator is very sensitive to the applied force. The acceptable maximum force for such a resonator is in the range of ten μN in compression. Beyond this force, the resonator collapses and is no longer operational. Moreover, by the effect of an acceleration or an impact, the mass can behave like a resonator and start vibrating at its resonance frequency, which can expose the nanoresonator to input forces that are higher than its limits or make the nanoresonator non-operational as long as the mass is moving, which results in interrupting reading of the acceleration. This read-out interruption problem also occurs in the case of resonators with micrometric dimensions.

A solution to overcome this problem is to dampen the dynamic behaviour of the mass, for this purpose the sensor is placed in an environment at the atmospheric pressure. The resonator with nanometric dimensions is then protected from the resonance of the mass and it is stabilised against the vibrations and impacts applied to the seismic mass. However, placing a resonator in an environment at the atmospheric pressure makes it substantially less performant.

Moreover, it might be desirable to insulate the resonator, for example to protect it from a fluid in contact with the test body in an application to a flowmeter.

DISCLOSURE OF THE INVENTION

Consequently, it is an aim of the present invention to provide a highly sensitive and performant resonant force sensor.

The aim set out hereinabove is achieved by a resonant force sensor including at least one test body hanging to a support, at least one strain gauge with nanometric dimensions which is subjected to a strain because of the movement of the test body. Each of the test body and the strain gauge with nanometric dimensions is disposed in one environment, the two environments being tightly separated from each other. The sensor also including transmission means for transmitting the movement of the test body to the seismic mass between the two environments.

The transmission means may include a transmission shaft directly secured to the test body, and rotatably hinged relative to the support about a direction of the plane of the sensor, at least one transmission arm rigidly connected to the transmission shaft and mechanically acting on the strain gauge. The transmission arm extends between the two environments. Moreover, the sensor is made in a thick substrate over which a stack of layers is formed, this stack including at least one layer with a nanometric thickness separated from the substrate by a sacrificial layer. The test body is made in the substrate. The sealed insulation of the two environments is formed by the layer with a nanometric thickness and by the sacrificial layer and the strain gauge is formed in the layer with a nanometric thickness. Thus, in the case of an accelerometer, the strain gauge(s) can be located in a low-pressure environment and the seismic mass in an environment at a higher pressure.

In the case of a flowmeter, the measuring means are insulated from a fluid coming into contact with the test body.

In an advantageous example, the strain gauge(s) are formed in the layer with a nanometric thickness.

The strain gauge may be a resonator formed by a nanometric-sized vibrating beam or a nanometric-sized piezoresistive gauge.

One of the objects of the present invention is a force sensor including a support, a test body hanging to the support, means for measuring a force including at least one strain gauge, mechanical transmission means between the test body and the measuring means so that a movement of the test body applies a strain onto the measuring means in a first direction of the plane of the sensor, the transmission means being hinged relative to the support about a second direction in the plane of the sensor, the test body being accommodated within a first volume, the measuring means being accommodated within a second volume, the first volume and the second volume being tightly insulated from each other by sealed insulation means, the sensor includes, in that order, a thick substrate, a sacrificial layer over the substrate, a nanometric layer, a protective layer and a micrometric layer, the test body and at least one portion of the support are formed in the substrate, the sealed insulation means are partially formed by the nanometric layer and by the sacrificial layer and the at least one strain gauge is formed in the nanometric layer.

For example, the transmission means include a transmission shaft crossing the sealed insulation means and rotatably hinged relative to the micrometric layer about an axis of rotation orthogonal to the first direction and to an out-of-plane direction and at least one transmission arm fastened on the transmission shaft disposed in the second volume and transmitting a strain to the measuring means.

The measuring means may include means for setting said strain gauge in vibration and means for reading the variation of the resonance frequency of the resonator.

In an advantageous example, the measuring means include two strain gauges formed in the nanometric layer mounted in differential and the transmission means include two transmission arms.

For example, the second volume is at a pressure P2 lower than the atmospheric pressure, advantageously lower than 10 mBar.

According to an additional feature, the transmission arm is rotatably hinged by means of two aligned torsion beams extending on either side of the transmission shaft between the transmission arm and the micrometric layer.

In an advantageous example, the force sensor includes decoupling means between the transmission arm and the strain gauge at least so as to limit the strain applied to the strain gauge in an out-of-plane direction. The decoupling means may include a carriage guided in translation according to the first direction of the plane and interposed between the transmission plane and the strain gauge. The decoupling means may also include at least two beams rotatably hinged about an out-of-plane direction and connected to each other, to the transmission arm and to the resonator so as to form lever arms and amplify the strain transmitted by the transmission arm to the resonator.

The force sensor may include a cap secured to the micrometric layer and partially delimiting the second volume.

Quite advantageously, the at least one strain gauge is a vibrating beam resonator. Another object of the present application is an in-plane accelerometer including a force sensor according to the invention, wherein the centre of mass of the test body and the axis of rotation are in the same plane normal to the first and second directions and wherein the pressure of the first volume is at the atmospheric pressure.

Another object of the present application is an out-of-plane accelerometer including a force sensor according to the invention, wherein the centre of mass of the test body and the axis of rotation are in two planes normal to the first and second directions, said planes being distinct, and wherein the pressure of the first volume is at the atmospheric pressure. Another object of the present application is a flowmeter intended to be disposed in a flow of a fluid, including a force sensor according to the invention and wherein the substrate is structured to enable the fluid to come into contact with a face of the test body, said face being orthogonal to the first direction.

According to an additional feature, the substrate may include wafers extending in out-of-plane directions.

According to an additional feature, the substrate has a dimension in the out-of-plane direction smaller than that of the test body.

BRIEF DESCRIPTION OF THE DRAWINGS

The present invention will be better understood based on the following description and from the appended drawings wherein:

FIG. 1 is a perspective view of an example of an accelerometer according to the invention.

FIG. 2 is a bottom view of FIG. 1, the cap not being represented.

FIG. 3 is a perspective view of the accelerometer of FIG. 1, a portion of the support being removed.

DETAILED DISCLOSURE OF PARTICULAR EMBODIMENTS

FIGS. 1 to 6 show an example of an accelerometer according to the invention partially represented. This accelerometer is configured to detect an acceleration in the plane. The accelerometer is made by microelectronics techniques by stacking and structuring layers. The plane of the accelerometer is defined by the directions X and Y in which the accelerometer primarily extends which are those in which the substrate and the different layers composing the accelerometer extend. In this example, it is supposed that it is desired to measure the acceleration according to the direction X.

The accelerometer includes a support 2, a seismic mass 4 hanging to the support 2 and means for measuring 6 (FIGS. 4, 5 and 6) the acceleration.

Furthermore, the accelerometer includes a first volume V1 within which the seismic mass 4 is accommodated, and a second volume V2 within which the measuring means 6 are accommodated. The volumes V1 and V2 are tightly insulated from each other and at different pressures. The volume V1 is at a pressure P1 higher than the pressure P2 of the volume V2. For example, P1 is at the atmospheric pressure and P2 is at most at 10 mbar, advantageously lower than 1 mbar and even more advantageously lower than $10^{-2}$ mbar, and possibly the vacuum in the range of $10^{-6}$ mbar.

Figure 4:
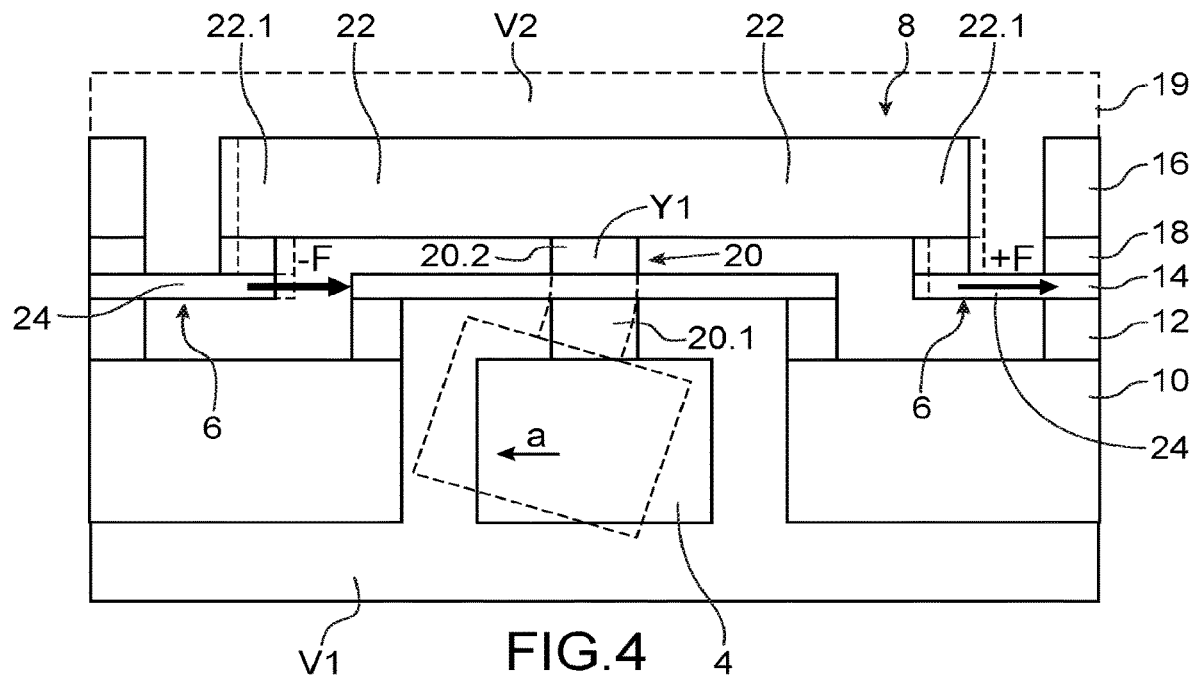
FIG. 4 is a sectional view according to the plane A-A of FIG. 1.

Furthermore, the accelerometer includes means 8 for transmitting a force and a movement between the seismic mass and the measuring means, and by which the mass is hanging. In FIG. 4, a sectional view of FIG. 1 can be seen.

The accelerometer is made according to microelectronics processes from a substrate 10 referred to as "bulk". For example, the thickness of the bulk is comprised between 100 μm and 1,000 μm. For example, the substrate is made of silicon.

A stack of layers is formed over the substrate. The stack includes a layer 12 which forms a sacrificial layer and which contributes to sealing between the two volumes, the layer 12 is for example made of $SiO_2$. The sacrificial layer has a thickness comprised for example between 3 μm and 5 μm.

The stack also includes a conductive layer 14 with a nanometric thickness referred to as "nanometric layer" or "NEMS layer". For example, the thickness of the "NEMS layer" is comprised between 20 nm and 2 μm. For example, the layer 14 is made of silicon. The layer 14 contributes to sealing between the two volumes and it is in this layer that the resonators are formed.

The stack also includes a layer with a micrometric thickness 16 called "micrometric layer" or "MEMS layer". For example, the thickness of the "NEMS layer" comprised between 2 μm and 200 μm, and its thickness is selected so as to be at least twice as thick as the NEMS layer.

In this example, an intermediate layer 18 between the NEMS layer 14 and the MEMS layer 16 is present ensuring upon manufacture the protection of the NEMS layer when structuring the MEMS layer. For example, this protective layer has a thickness comprised between 1 μm and 5 μm. For example, the protective layer is made of $SiO_2$.

In the represented example, the substrate forms a support for the accelerometer, and partially delimits the volume V1 with the NEMS layer and the sacrificial layer which forms a sealing element between the NEMS layer and the substrate 10. The sealing bead surrounds the mass.

The volume V2 is partially delimited by the surface of the substrate 10 covered by the sacrificial layer 12, the NEMS layer 14 and the sacrificial layer 12 between the substrate 10 and the NEMS layer 14. Furthermore, a cap 19 (schematically represented in dotted lines) is affixed on the stack of layers and closes the volume V2. In the represented example, the volume V1 is at the atmospheric pressure and is open to the outside.

The seismic mass 4 is formed in the substrate 10, it has for example a planar section of 1 $mm^2$; the transmission device is formed in the sacrificial layer 12, the MEMS layer 16, and the intermediate layer 18.

The transmission device includes a transmission shaft 20 extending on either side of the NEMS layer 14 substantially in the out-of-plane direction and at least one transmission arm 22, advantageously two in the represented example. The transmission shaft 20 includes a portion 20.1 in the volume V1 is connected to the mass and a portion 20.2 in the volume V2 is connected to the transmission arm.

The two transmission arms 22 extend from the longitudinal end of the transmission shaft 20 located in the volume V2 along the direction X. The transmission arms 22 extend along the direction X in opposite directions and each includes a longitudinal end 22.1.

The transmission shaft 20 is rotatably hinged about an axis of rotation Y1 parallel to the direction Y by means of two beams 23 extending in the direction Y between the portion 20.2 of the transmission shaft and the rest of the MEMS layer 16 which surrounds the portion 20.1. The two beams 23 are aligned and are deformable in torsion. The axis of rotation Y1 is located substantially at the middle of the torsion beams in the direction Z. This rotation is made possible because of the small thickness of the NEMS layer 14, which confers some flexibility thereon.

The distance between the axis of rotation Y1 and the transmission arms 22 is small so that the movement of the transmission arms is as similar as possible to a translational movement along the direction X alone.

In order to make the accelerometer insensitive to out-of-plane accelerations and effectively measure the in-plane acceleration, the centre of mass and the axis of rotation Y1 of the transmission shaft are located in the same plane extending in the directions Y and Z.

The mass is symmetrical with respect to a vertical plane passing through the axis of rotation and normal to the direction X.

Furthermore, it preferably has at its connection to the transmission shaft 20 an area with a reduced dimension in the direction X, which allows setting the length of the transmission arms and the dimensions of the mass independently to minimise the effect of rotation in the nanoresonators.

This shape is not restrictive, and any other mass shape that meets the previously-described symmetry conditions will be functional, for example a mass with a circular shape or with a parallelepiped shape.

Figure 5:
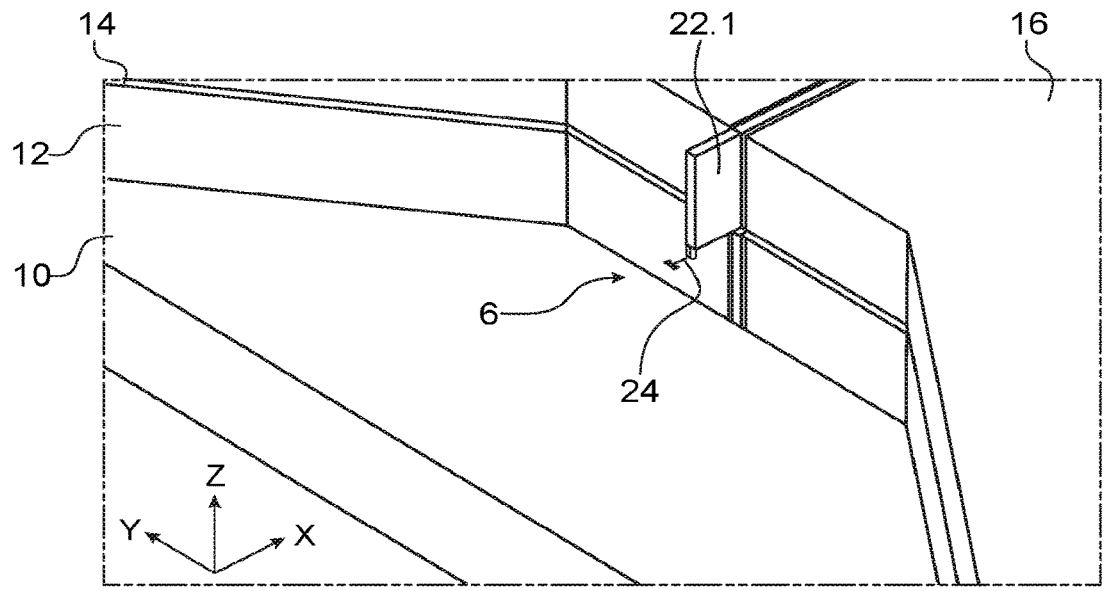
FIG. 5 is a detail view of FIG. 3, the nanoresonator being represented.
Figure 6:
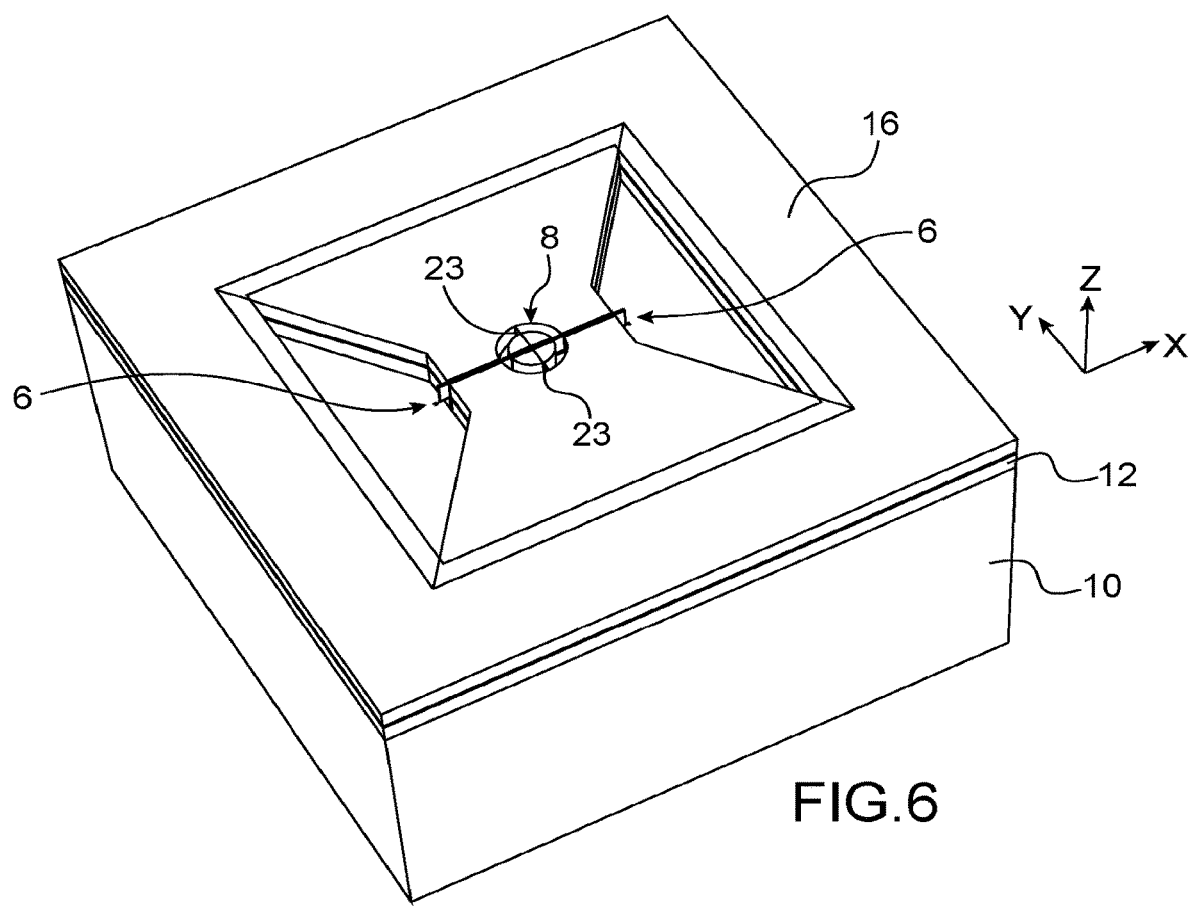
FIG. 6 is a top view of FIG. 1 without the cap, the two nanoresonators being represented.

In the represented example and advantageously, the measuring means include two resonators 24 formed in the NEMS layer and each resonator 24 hangs between a free end 22.1 of a transmission arm and a fixed portion of the accelerometer. In FIGS. 4, 5 and 6, one can see the resonators. The resonators are mounted in differential. In this representation, the sacrificial layer 12 and the rest of the NEMS layer 14 are not represented beneath and around nanoresonators for clarity, but these are nevertheless present. The sacrificial layer allows supporting the nanoresonators and the NEMS layer around the nanoresonators and is intended for the formation of the connection tracks of the nanoresonators, the contact pads and the decoupling means that will be described hereinbelow. FIG. 3 shows the NEMS layer cleared off the MEMS layer and the protective layer, the nanoresonators not being represented.

FIG. 4 shows, represented in dotted lines, the seismic mass moved in rotation about the axis Y by the effect of an acceleration in the direction X, as well as the transmission device moved in the direction X, and the deformation of the resonators.

The resonators are mounted in differential. The arrows −F and +F symbolise the strain applied to the resonators. −F symbolises a compressive strain and +F symbolises a tensile strain.

Alternatively, the hinge device includes only one transmission arm and the measuring means include one single resonator.

The measuring means also include means for setting the resonators in vibration at their resonance frequency. For example, it consists of a pair of electrodes on either side of each resonator. Furthermore, the measuring means include means for reading the variation of the resonance frequency of each resonator, for example capacitive means, piezoresistive means or piezoelectric means.

The volume V1 may be in communication with the external environment to set the pressure P1 at the atmospheric pressure as is the case in the represented example. Alternatively, the pressure P1 is lower or higher than the atmospheric pressure, and is higher than the pressure P2.

The operation of the accelerometer will now be described.

An acceleration in the direction X is applied to the seismic mass 4 which is then set in rotation about the axis Y1 (FIG. 4). This rotation is transmitted via the transmission shaft 20 to the transmission arms 22 which move at least in translation in the direction X and apply a strain onto the resonators, one is compressed and the other is stretched. The transmission shaft 20 blocks the deflections in the direction Y because of the stiffness of the torsion beams in this direction.

Prior to the acceleration, the resonators have been vibrating at a given resonance frequency. By the effect of the tensile and compressive strain, their resonance frequencies vary. The measuring means measure these frequency vibrations which allow deducing the acceleration.

The seismic mass being accommodated within an environment at the atmospheric pressure, it is dampened. Thus, the movement of the mass, for example in the event of an external impact, has a lower amplitude and the risks of damage or disturbance of the operation of the resonators are reduced.

The resonators being disposed in a low-pressure environment, and possibly in vacuum, they have a high quality factor.

Thanks to the invention, the accelerometer is performant while protecting the nanoresonators from the resonance of the mass, from all vibrations of the seismic mass and from impacts applied thereon.

Figure 7:
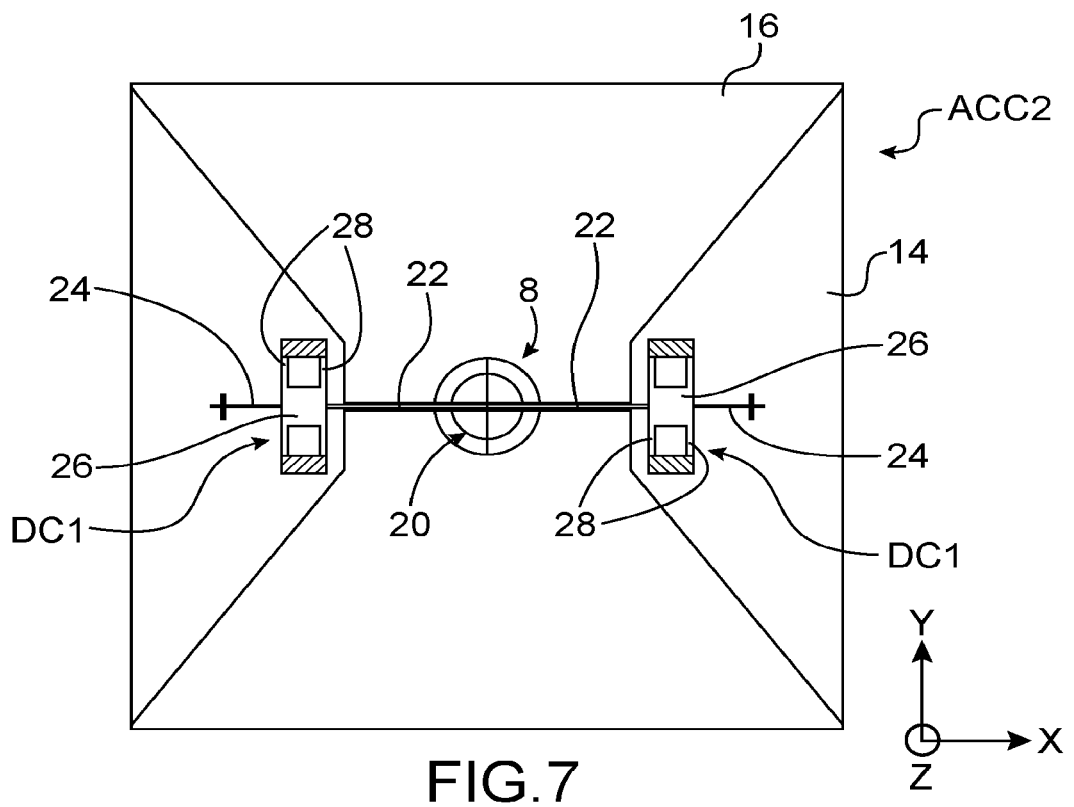
FIG. 7 is a top view of another example of an accelerometer.

FIG. 7 shows an advantageous example of an accelerometer ACC2 according to the invention viewed from above, the cap being omitted.

The accelerometer ACC2 differs from the accelerometer ACC1 in that it includes means allowing avoiding the parasitic modes of the seismic mass which degrade the operation of the sensor.

Decoupling means DC1 are interposed between each nanoresonator and the transmission arm connected to the mass so that the movement of the resonator at its resonance frequency in its frequency range of about one MHz or a few MHz cannot activate the parasitic modes of the mass. Thus, the situation where the resonance frequency of the resonator matches with the frequency of one of the modes of the seismic mass is avoided. In this example, the means DC1 include a carriage 26 with a square shape when viewed from above, fastened by one end to the free end of the transmission arm 22 and by the opposite face to a longitudinal end of the resonator 24. Moreover, the carriage 26 is guided in the direction X by means of two pairs of beams 28 on either side of the direction X, one end of which is anchored on the NEMS layer. The beams 28 are deformable in bending in the direction X.

Figure 8:
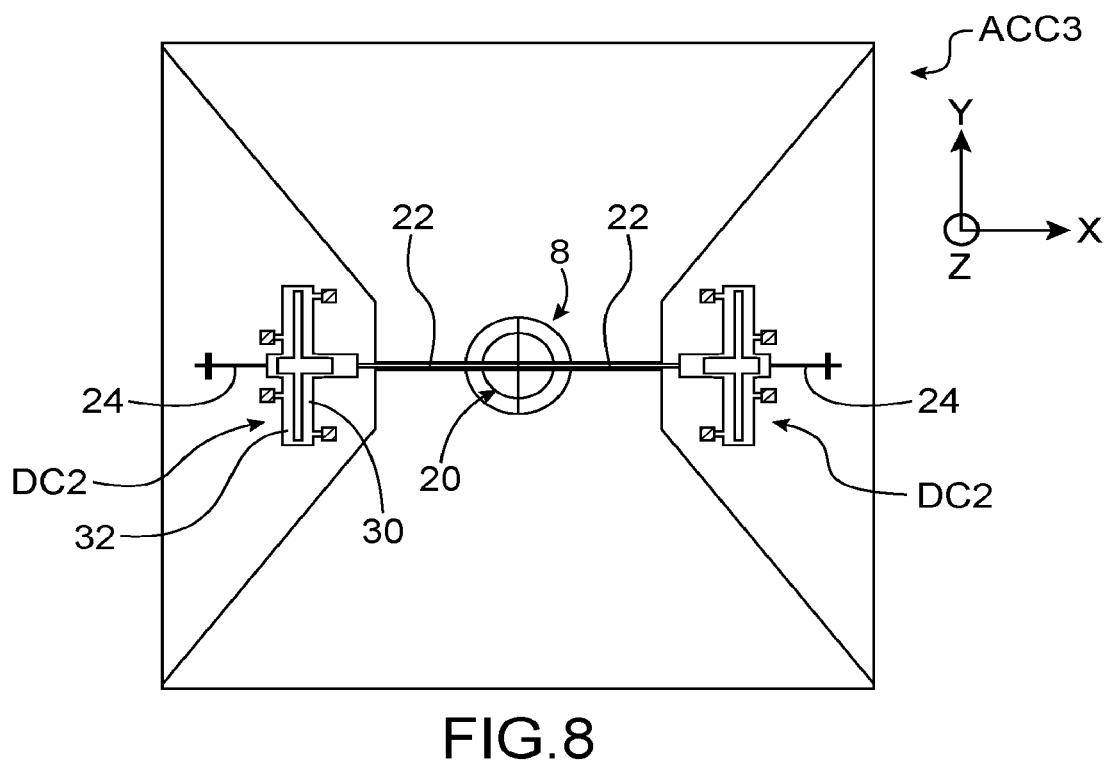
FIG. 8 is a top view of another example of an accelerometer.

FIG. 8 shows an accelerometer ACC3 including another example of decoupling means DC2.

The decoupling means DC2 include a double-lever system. The implementation of such a system allows for an amplification that allows compensating all or part of the sensitiveness loss that might result from the implementation of decoupling means.

The double-lever system includes a first lever 30 and a second lever 32, each hinged on the substrate at one point A and B respectively. Each lever 30, 32 includes a large lever arm and a small lever arm. In this example, each of the rotational hinges is made by a beam deformable in bending anchored by one end on the NEMS layer and by another end to the lever.

The large lever arm of the first lever 30 is connected by one end to the free end of a transmission arm 22, and the small lever arm of the first lever 30 is connected by one end to the large lever arm of the second lever 32 and the small lever arm of the second lever 32 is connected to the nanoresonator 24. Thus, the force transmitted by the transmission arm 22 is amplified a first time and a second time. Advantageously, the double-lever system is symmetrical with respect to the direction X and includes two pairs of levers symmetrical with respect to the axis X.

For example, the sensitiveness can be amplified between 10 times and 100 times.

Figure 9A:
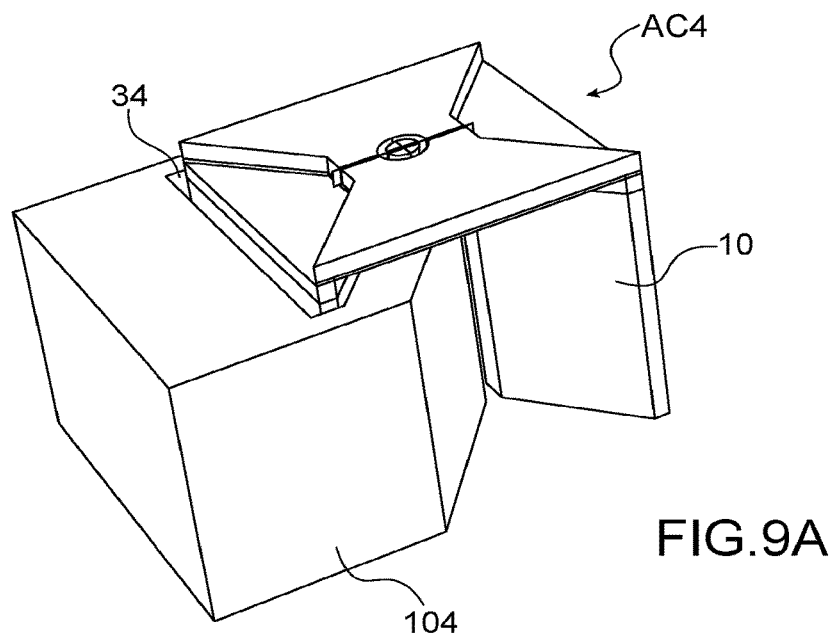
FIG. 9A is a perspective view of an example of an out-of-plane accelerometer.
Figure 9B:
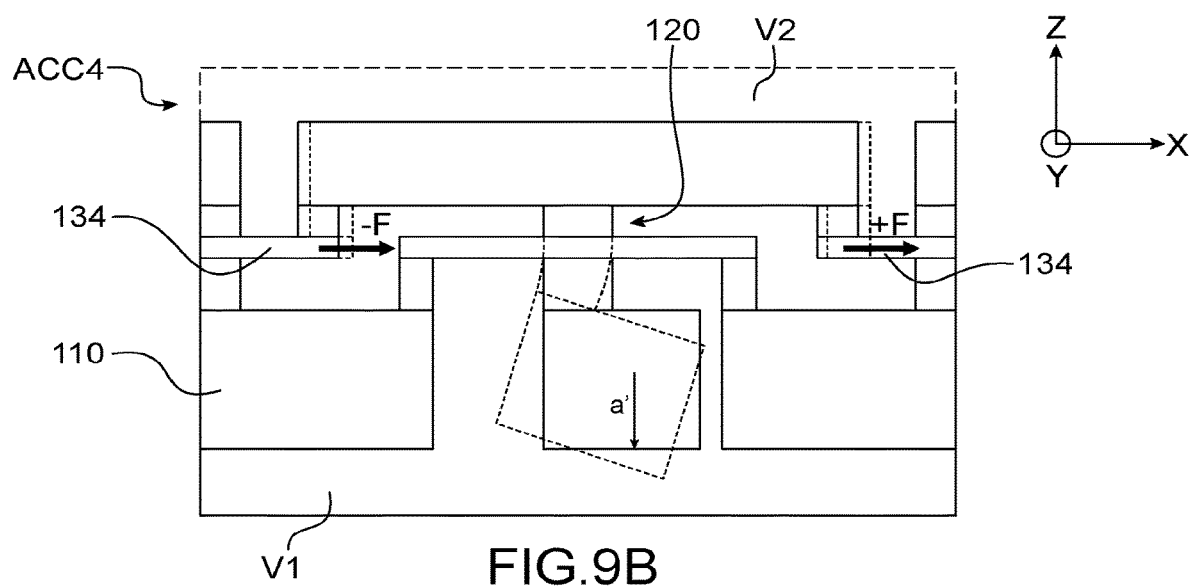
FIG. 9B is a sectional view of the accelerometer of FIG. 9A.

FIGS. 9A and 9B show an embodiment of an out-of-plane accelerometer ACC4, i.e. measuring an acceleration according to the direction Z.

This accelerometer ACC4 differs from in-plane accelerometers in that the centre of mass of the seismic mass and the axis of rotation of the transmission shaft 120 are in planes extending in the distinct directions Y and Z, which results in creating a lever arm. The mass is then made sensitive to an out-of-plane acceleration a', as represented in dotted lines in FIG. 9B. One of the resonators 134 is stretched and the other resonator is compressed. Hence, the mass 104 is not symmetrical with respect to a vertical plane passing through the axis of rotation of the transmission shaft as shown in FIG. 9B. In this example, the substrate 110 is structured so as to form a mass which surrounds a portion of the substrate which remains fixed. The mass includes an open-through passage 34. This configuration allows making a large-sized mass.

Figure 10A:
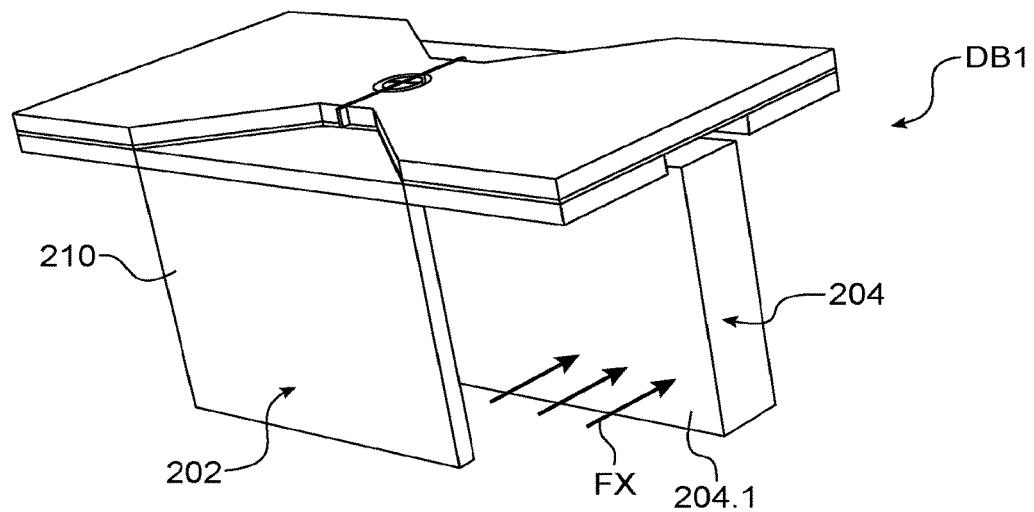
FIG. 10A is a perspective view of an example of a flowmeter.
Figure 10B:
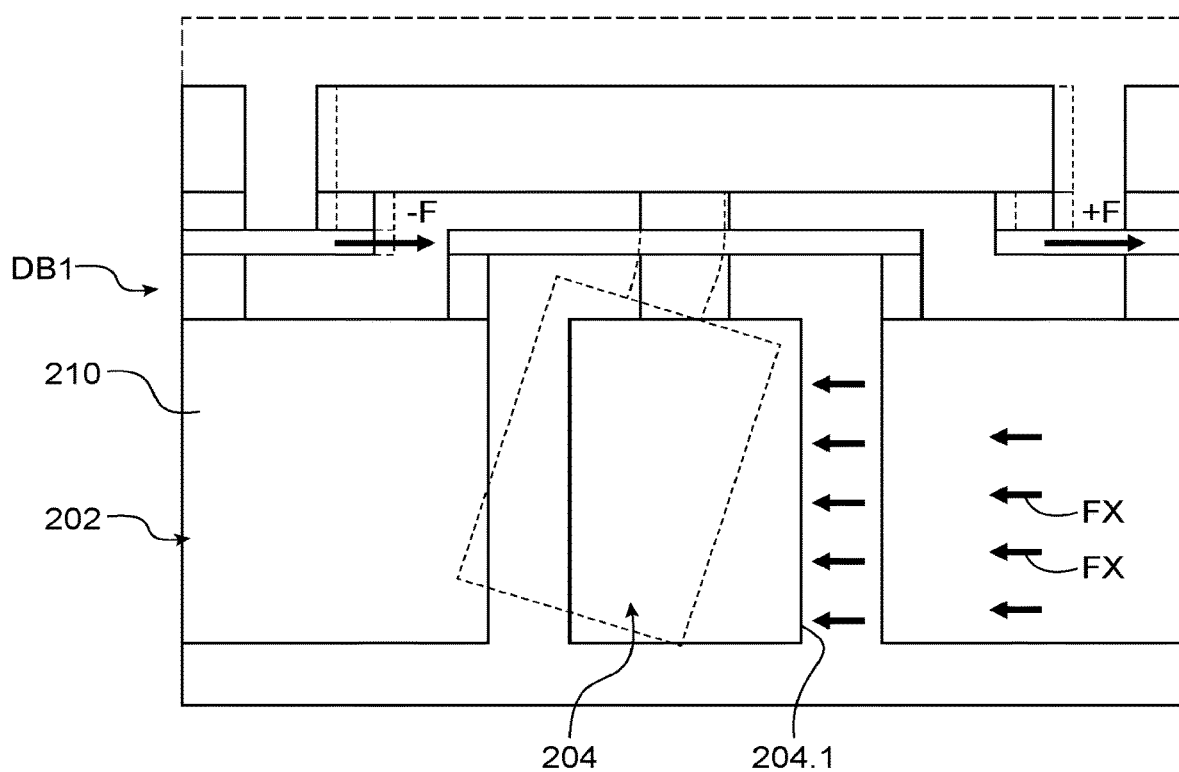
FIG. 10B is a sectional view of the flowmeter of FIG. 10A.

FIGS. 10A and 10B show an example of a flowmeter DB1 implementing a force sensor according to the invention.

The flowmeter DB1 is suited to measure a flow in the plane of the sensor, i.e. the plane XY. The flowmeter DB1 is configured so that the test body 104 is sensitive to the flow of a fluid (symbolised by the arrows FX). For this purpose, the support 102 of the flowmeter is configured to enable the flow of the fluid so that the fluid exerts a pressure on the surface 204.1 of the test body 204. For example, in the case where the support 202 is formed by the substrate 210, wafers are formed in the substrate 210, for example over a portion of its height.

Furthermore, the test body 204 is configured so as to have a large surface that is sensitive to the flow of the fluid. In the example of FIGS. 10A and 10B, the test body has a large dimension in the direction Y normal to the direction of the flow. Moreover, the test body 204 has a reduced dimension in the direction X to reduce its mass.

The sealed insulation between the two volumes protects the resonators from the fluid flowing in the volume V2.

Figure 11A:
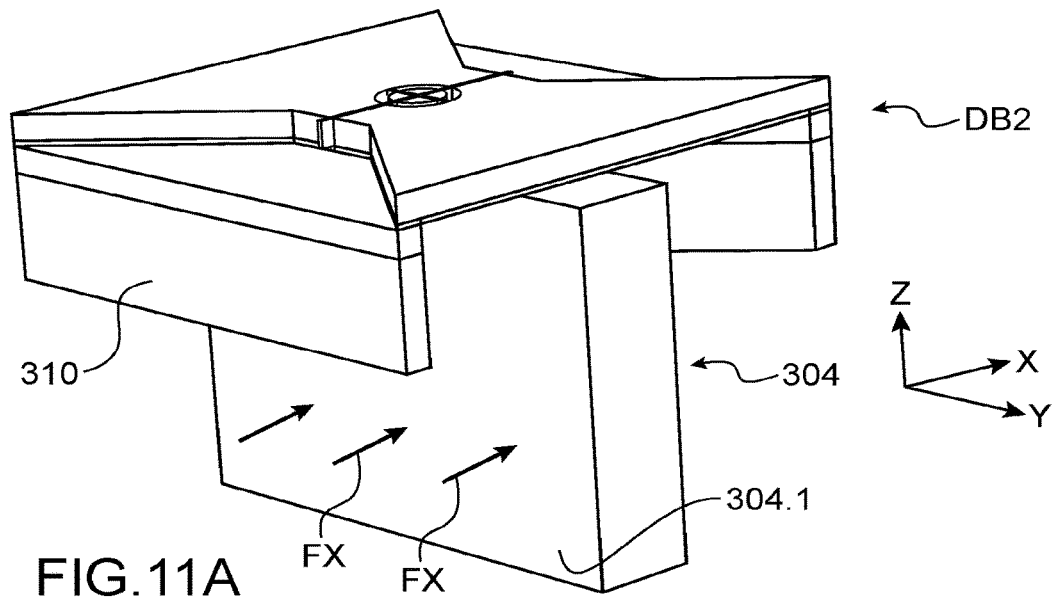
FIG. 11A is a perspective view of an example of a flowmeter.
Figure 11B:
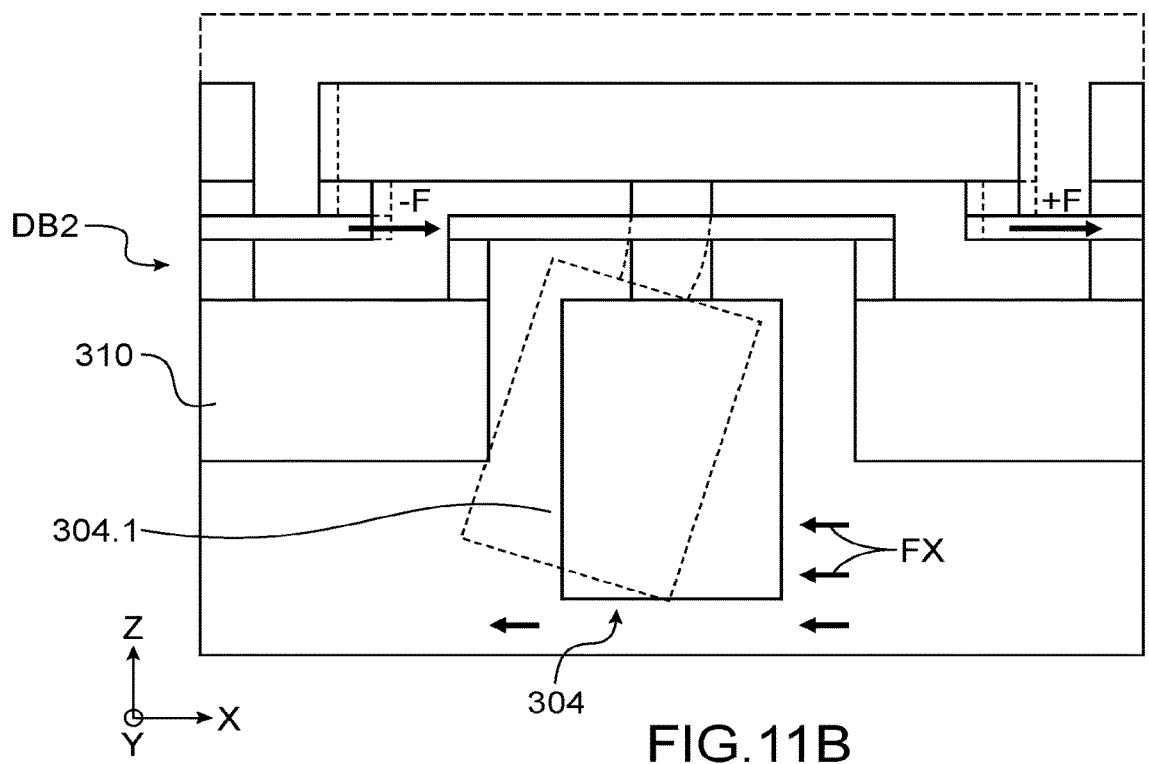
FIG. 11B is a sectional view of the flowmeter of FIG. 11A.

FIGS. 11A and 11B show another example of a flowmeter DB2, the latter differing from the flowmeter DB1 in that the test body 304 is cleared so as to enable the fluid to come into contact with the lower portion of the sensitive face 304.1 of the test body remote from the axis of rotation of the transmission shaft. This clearance is obtained by etching the substrate 310 in order to reduce its thickness and let the test body 304 of the substrate 310 protrude in the direction Z. For example, for a substrate with an initial thickness 1 mm, its etched over 0.5 mm. Thus, a test body measuring 1 mm in width, i.e. in the direction Y has a surface subjected to the pressure of the fluid of 1 mm×0.5 mm. Thanks to an extended lever arm, this configuration allows profiting from an additional amplification.

In the represented examples, the measuring means include nanoresonators formed in the NEMS layer. Alternatively, the measuring means include microresonators formed in the MEMS layer. These resonators are mechanically connected to the transmission arms 22 of the transmission means.

In another embodiment, the measuring means include at least one piezoresistive gauge, advantageously two mounted in differential. All of the above-described examples can implement one or more piezoresistive gauge(s) instead of the resonator(s).

The force sensor according to the invention is manufactured with the techniques of manufacturing microelectromechanical and nanoelectromechanical systems or M&NEMS (Micro&nanomicroelectromechanical systems).

For example, it may be manufactured using the method described in the document WO201148138.

We will briefly describe the steps of manufacturing the accelerometer ACC1.

For example, we start from a Silicon on Insulate or SOI substrate including a substrate 10 made of silicon forming the bulk, a $SiO_2$ layer forming the sacrificial layer 12 and a monocrystalline silicon layer forming the NEMS layer.

The NEMS layer 14 is structured in particular to form the nanoresonators.

Afterwards, the protective layer 18 is formed over the NEMS layer 14.

Afterwards, the MEMS layer 16 is formed over the protective layer 18.

The MEMS layer 16 is structured, for example by etching, in particular to form the transmission arms 22. The presence of the protective layer allows etching the MEMS layer without deteriorating the NEMS layer.

Afterwards, the protective layer above the nanoresonators is suppressed.

Afterwards, the nanoresonators are cleared by etching the sacrificial layer.

Making of the transmission shaft may be done according to the following method. First of all, etching at the front face is done. For this purpose, the NEMS layer is protected over the entire area around the transmission shaft which ensures sealing. A growth of the MEMS layer at the centre of this area allows drawing the transmission shaft 20 as well as the transmission arms 22. The protective NEMS layer is then cleared over the entirety of the sealing area of the NEMS layer except at its centre to keep the continuity of the transmission shaft 20.

In turn, the seismic mass is etched at the rear face. Trimming thereof is done on the bulk layer. Once the bulk layer is etched, the sacrificial layer 12 is etched in order to clear the mass except at its centre to keep the continuity of the transmission shaft 20. Afterwards, a cap is affixed over the MEMS layer so as to form the volume V2. Affixing the cap is done in an environment at the pressure P2 so that the pressure in the volume V2 namely at the pressure P2.

It can be considered to affix the accelerometer on a support.

Alternatively, the transmission shaft is formed only in the MEMS layer.

The invention claimed is:

1. A force sensor comprising:
   a support,
   a test body hanging to the support,
   at least one strain gauge,
   mechanical transmission means between the test body and the at least one strain gauge so that a movement of the test body applies a strain onto the at least one strain gauge in a first direction of the plane of the sensor, the transmission means being hinged relative to the support about a second direction in the plane of the sensor, the test body being accommodated within a first volume, the at least one strain gauge being accommodated within a second volume and being movable in the second volume, the first volume and the second volume being tightly insulated from each other by a sealed insulation,
   wherein the sensor includes, in that order, a thick substrate, a sacrificial layer over the substrate, a nanometric layer, a protective layer and a micrometric layer,
   wherein the test body and at least one portion of the support are formed in the substrate,
   wherein the sealed insulation is partially formed by the nanometric layer and by the sacrificial layer, and
   wherein the at least one strain gauge is formed in the nanometric layer, wherein the first volume is at a first pressure and the second volume is at a second pressure, the first pressure being higher than the second pressure.

2. The force sensor according to claim 1, wherein the transmission means includes a transmission shaft crossing the sealed insulation and rotatably hinged relative to the micrometric layer about an axis of rotation orthogonal to the first direction and to an out-of-plane direction and at least one transmission arm fastened on the transmission shaft disposed in the second volume and transmitting a strain to the at least one strain gauge.

3. The force sensor according to claim 2, wherein said at least one strain gauge includes a first strain gauge formed in the nanometric layer and a second strain gauge formed in the nanometric layer, said first strain gauge and said descond strain gauge being mounted in differential and the mechanical transmission means include two transmission arms.

4. The force sensor according to claim 1, wherein the second volume is at a pressure P2 lower than the atmospheric pressure.

5. The force sensor according to claim 2, wherein the transmission arm is rotatably hinged by means of two aligned torsion beams extending on either side of the transmission shaft between the transmission arm and the micrometric layer.

6. The force sensor according to claim 2, further including decoupling means between the transmission arm and the at least one strain gauge at least so as to limit the strain applied to the strain gauge in an out-of-plane direction.

7. The force sensor according to claim 6, wherein the decoupling means include a carriage guided in translation according to the first direction of the plane and interposed between the transmission plane and the at least one strain gauge.

8. The force sensor according to claim 7, wherein the decoupling means include at least two beams rotatably hinged about an out-of-plane direction and connected to each other, to the transmission arm and to the strain gauge so as to form lever arms and amplify the strain transmitted by the transmission arm to the strain gauge.

9. The force sensor according to claim 1, including a cap secured to the micrometric layer and partially delimiting the second volume.

10. The force sensor according to claim 1, wherein the at least one strain gauge is a vibrating beam resonator configured to vibrate in said second volume.

11. The force sensor according to claim 10, further including means for setting the vibrating beam in vibration and means for reading the variation of the resonance frequency of the vibrating beam.

12. An in-plane accelerometer including a force sensor according to claim 1, wherein a centre of mass of the test body and an axis of rotation are in a same plane normal to the first and second directions, and
   wherein a pressure of the first volume is at atmospheric pressure.

13. An out-of-plane accelerometer including a force sensor according to claim 1, wherein a centre of mass of the test body and an axis of rotation are in two planes normal to the first and second directions, said planes being distinct, and
   wherein a pressure of the first volume is at atmospheric pressure.

14. A flowmeter intended to be disposed in a flow of a fluid, including a force sensor according to claim 1, and wherein the substrate is structured to enable the fluid to come into contact with a face of the test body, said face being orthogonal to the first direction.

15. The flowmeter according to claim 14, wherein the substrate includes wafers extending in out-of-plane directions and wherein the substrate has a dimension in the out-of-plane direction smaller than that of the test body.

16. The force sensor according to claim 4, wherein the first volume is at the atmospheric pressure and wherein the second volume is at a pressure P2 lower than 10 mBar.

17. The force sensor according to claim 1, wherein a fluid is flowing into the second volume V2, the sealed insulation between the first volume and the second volume being configured so as to prevent the fluid flowing into the first volume V1.

18. The force sensor according to claim 1, wherein the second volume is partially delimited by a surface of the substrate, by the nanometric layer, by the sacrificial layer and by a cap opposite the surface of the substrate.

* * * * *